United States Patent [19]

Sakamoto

[11] 4,420,778
[45] Dec. 13, 1983

[54] HEAD TRACKING CONTROL SYSTEM FOR A HELICAL SCAN VTR

[75] Inventor: Hitoshi Sakamoto, Zama, Japan

[73] Assignee: Sony Corporation, Tokyo, Japan

[21] Appl. No.: 286,267

[22] Filed: Jul. 23, 1981

[30] Foreign Application Priority Data

Jul. 23, 1980 [JP] Japan .................................. 55-100816

[51] Int. Cl.³ ...................... G11B 21/10; G11B 21/04; H04N 5/78
[52] U.S. Cl. ..................................... 360/77; 360/10.2; 360/70
[58] Field of Search .................... 360/77, 78, 73, 107, 360/109, 10, 11, 36; 358/4, 8

[56] References Cited

U.S. PATENT DOCUMENTS

| | | | |
|---|---|---|---|
| 4,285,017 | 8/1981 | Arter | 360/77 |
| 4,287,538 | 9/1981 | Sakamoto | 360/10 |
| 4,356,522 | 10/1982 | Takano | 360/70 |
| 4,361,857 | 11/1982 | Sakamoto | 360/77 |
| 4,364,097 | 12/1982 | De Boer | 360/70 |
| 4,366,515 | 12/1982 | Takano | 360/77 |
| 4,370,685 | 1/1983 | Hosoi | 360/77 |

*Primary Examiner*—Robert M. Kilgore
*Attorney, Agent, or Firm*—Lewis H. Eslinger; Alvin Sinderbrand

[57] ABSTRACT

A video tape recording/reproducing apparatus for reproducing video signals recorded in successive parallel tracks on a magnetic tape, includes a magnetic head movable in a direction generally along each of the tracks in a scanning path from a beginning end to a concluding end thereof for reproducing signals recorded therein, and a bi-morph leaf for mounting the head and being operative to deflect the head in a direction transverse to the direction along the tracks. During the scanning operation, the bi-morph leaf is supplied with a dithering signal for wobbling the head transversely with respect to the longitudinal direction of the record tracks, a tracking error signal to correct deviations of the head trace from the tracks to be scanned and a slant compensation signal to correct any inclination tracking error of the head. During the non-scanning operation, a jump signal is supplied to the bi-morph leaf for deflecting the head to accurately scan the beginning of the tracks. The present invention also includes a sample and hold circuit and a comparator circuit for producing a polarity signal corresponding to the direction of any deviation between the scanning trace of the head and the track then being scanned thereby, at the beginning end of the scanned track, and an UP/DOWN counter for producing and storing a control signal and for supplying the control signal to the bi-morph leaf so as to control the latter to deflect the head to accurately scan the beginning ends of the tracks, the counter being controlled by the comparator circuit to change the value of the stored control signal by an incremental amount by counting either UP or DOWN during each scan in accordance with the direction of the deviation at the beginning ends of the tracks.

15 Claims, 4 Drawing Figures

HEAD TRACKING CONTROL SYSTEM FOR A HELICAL SCAN VTR

BACKGROUND OF THE INVENTION

1. Field of the Invention

This invention relates generally to apparatus, such as a video tape recorder (VTR) of the so-called "helical scan type", in which video or other information signals are recorded in successive parallel tracks which are skewed or extend obliquely on a magnetic tape and, more particularly, is directed to an improved tracking control system by which a magnetic head or other transducer in such apparatus is made to accurately scan the track or tracks in which the video or other information signals are recorded.

2. Description of the Prior Art

In a helical-scan VTR, the magnetic tape extends helically about at least a portion of the periphery of a guide drum and is adapted to be moved or advanced in the longitudinal direction of the tape while at least a portion of the guide drum is rotated, and the transducer or magnetic head is mounted on a rotated portion of the guide drum so as to rotate with the latter and thereby repeatedly scan across the tape in a path at an angle to the longitudinal direction of the tape. During the recording operation of the VTR, the angle between the scanning path, and hence each record track, and the longitudinal direction of the tape is dependent on the rotational speed of the rotary head and also the speed at which the magnetic tape is longitudinally advanced. Accordingly, if the speed and direction of advancement of the magnetic tape are not the same during the reproducing operation as during the recording operation, then the scanning path of the magnetic head during reproducing will not precisely follow or coincide with a record track on the tape during each movement of the head across the tape and, accordingly, the recorded video or other information signals may not be correctly or accurately reproduced.

Various tracking control or servo systems have been proposed for maintaining correct tracking or scanning of the record tracks by the rotary head. In the most desirable of these known arrangements, means are provided for deflecting the head in a direction normal to the plane of its rotation, that is, in a direction which is transverse in respect to the direction along each of the record tracks, and the amount of such deflection is electrically controlled during the movement of the head along each track so as to achieve accurate scanning of the latter.

Generally, the transducer deflecting device in the above systems is constituted by an electro-mechanical element, such as a bi-morph leaf, which is contructed by laminating two piezo-ceramic leaves with at least one electrode plate, and which is deflected in accordance with a drive voltage supplied thereto. For example, in U.S. Pat. application Ser. Nos. 6/073,246, 6/152,117, 6/232,014, and 6/243,352 (now U.S. Pat. No. 4,370,685), filed Sept. 6, 1979, May 21, 1980, Feb. 6, 1981, and Mar. 3, 1981, respectively, all having a common assignee herewith, there is disclosed an automatic tracking control system in which the drive signal applied to the transducer deflecting device comprises a jump signal or track selection control signal for determining the starting position of the transducer during non-normal or special reproducing modes and, thereby, the next desired track to be followed or scanned thereby, a dithering signal or oscillation, a track following error signal, and a slant angle correction signal. In this manner, the tracking error between the recorded track on the magnetic tape and the scanning path of the reproducing head is corrected to effect coincidence therebetween. A reproduced picture of high quality without any guard band noise can thus be obtained even when the tape speed is varied during various special reproducing modes, such as during slow-, still-, fast- or reverse motion-playback modes.

Generally, the record tracks are formed along a curved path on the tape rather than an ideal straight line path. Thus, each record track, which includes one field of video information, has a small skew distortion which results from distortion of the tape and the like. In particular, the beginning end and the concluding end of each track deviates from and is inclined with respect to the ideal straight line path of the respective record track. Because of the nature of the inclination at the beginning and concluding ends of each track, the magnetic head, after scanning the concluding end of a track, is offset when it begins scanning the beginning end of the next adjacent track. This is compensated for in the above-mentioned U.S. patent applications by means of the track following error signal for bringing the magnetic head into alignment with the track then being scanned thereby. However, with such method of correction, the offset deviation is corrected only after the magnetic head has begun scanning the track. Thus, an accurate scanning of the track may only occur after the passage of a number of horizontal line intervals due to, for example, the delay in error detection of the tracking control system and the delay in response to the bi-morph leaf to the correction signal supplied thereto. In addition, with such offset deviation, a step pulse signal is supplied to the bi-morph leaf for effecting the correction thereof. However, such step pulse signal causes the bi-morph leaf, and therefore, the magnetic head secured thereto, to overshoot the record track. Accordingly, a transient vibration of the bi-morph leaf is produced which is slowly attenuated during the scanning operation and which results in a further deviation of the scanning trace of the magnetic head from the beginning of the record track then being scanned thereby. Thus, the beginning end of the track is not accurately scanned, which may result in a portion, for example, the top portion, of the reproduced picture being distorted.

In the case of special reproducing modes, that is, where the tape speed during reproduction is different from the tape speed during recording, the pitch of the track to be scanned is different from the pitch of the scanning trace of the magnetic head. In such case, it is necessary to effect tracing track selecting in order to perform overlap-tracing or interval-tracing. Overlap-tracing is required in a slow-motion playback mode where the tape speed is slower than the recording tape speed, and in which the head repeatedly traces or scans a recorded track and then the head scans the next track on the tape. Interval-tracing or skip-tracing is required in a fast-motion playback mode employing a tape speed faster than the recorded speed, and in which one or several tracks are skipped and the head only scans the tracks at intervals. The alteration of the head from the end of the track being traced to the beginning of the next desired one in the overlap-tracing or interval-tracing mode is called "track jump" or "flyback". The time period within which the reproducing head performs the jump or fly-back operation, is extremely short. Accordingly, a steep step or inclined voltage is applied to the bi-morph leaf as the jump or fly-back voltage therefor and, as a result, the transient vibration of the head becomes greater. This, of course, results in increased error or mistracking at the beginning end of the track.

It has been proposed, for example, in U.S. Pat. No. 4,148,082, having a common assignee herewith, to use a pilot signal which is superimposed on the horizontal synchronizing signals and which has a frequency that cyclically changes for successive horizontal blanking intervals. By means of the pilot signal, the tracking error between the scanning trace of the magnetic head and the track being scanned thereby can be determined. In this apparatus, such tracking error is detected at the beginning end of each track and stored, and is used to correct tracking errors at the beginning end of the next scanned track. The stored signal is supplied to the bi-morph leaf during the time when the head is not scanning a track, whereby the transducer is pre-displaced by the stored tracking error signal prior to beginning its scan of the next adjacent track. Since the deviation of a track from its ideal straight line path at the beginning and concluding ends thereof is generally the same for each track, the above pre-displacement of the magnetic head has the effect, to some extent, of reducing the tracking error at the beginning end of each track. However, even with this system, errors are still present in the tracking operation at the beginning end of each track. For example, because of the large noise component generally accompanying the tracking error signal, the stored tracking error signal does not correspond to the actual error at the beginning end of each track. Accordingly, after the initial pre-displacement of the magnetic head has been performed, a hunting operation must be performed in order for the magnetic head to accurately scan the track. In this regard, this system is similar to the systems of the aforementioned co-pending U.S. patent applications in that accurate scanning at the beginning end of the track is not achieved. Further, if there is a break in the similarity of the deviations at the beginning and concluding ends of the tracks, that is, if the beginning end of a track has a deviation from its ideal straight line path that is much greater than those of the remaining tracks, the tracking control system is greatly affected thereby so that accurate tracking may not be resumed until the magnetic head has scanned numerous tracks. Also, slight variations in the time when the tracking error signal is sampled at the beginning end of each track will have a significant effect on the scanning operation of the next track to be scanned.

OBJECTS AND SUMMARY OF THE INVENTION

Accordingly, it is an object of this invention to provide an apparatus for reproducing information signals recorded in successive parallel tracks on a record medium with an improved tracking control system that avoids the above-described difficulties encountered with the prior art.

More particularly, it is an object of this invention to provide a tracking control system, as aforesaid, which is operated in a stable manner.

It is another object of this invention to provide a novel tracking control system in which tracking errors or deviations between a scanning transducer and a record track are minimized.

It is still another object of this invention to provide a novel tracking control system in which a rotary head scans parallel record tracks and in which the head is controlled to traverse a scanning path which coincides with the record tracks even during the initial portions or beginning ends thereof.

It is yet another object of this invention to provide a novel tracking control system in which a rotary head scans parallel record tracks and in which the head is pre-displaced during each vertical blanking period so as to accurately scan the beginning of the next record track.

In accordance with an aspect of this invention, apparatus for reproducing information signals recorded in successive parallel tracks on a record medium includes transducer means adapted for movement along each of the tracks in a scanning path from a beginning end to a concluding end thereof for reproducing the signals recorded therein; transducer deflecting means for deflecting the transducer means in a direction transverse to the direction along the tracks; polarity detecting means for detecting the direction of any deviation between the scanning trace of the transducer means and the track then being scanned thereby at the beginning end of the scanned track; and updating means for producing and storing a control signal in response to the polarity detecting means and for supplying the control signal to the transducer deflecting means so as to control the latter to deflect the transducer means to accurately scan the beginning ends of the tracks, the updating means being controlled by the polarity detecting means to change the value of the stored control signal by a bias amount in accordance with the detected direction of any such deviation at the beginning end of each scanned track.

The above, and other, objects, features and advantages of the present invention will be apparent from the following detailed description of an illustrative embodiment of the invention which is to be read in connection with the accompanying drawings.

DETAILED DESCRIPTION OF A PREFERRED EMBODIMENT

Figure 2:
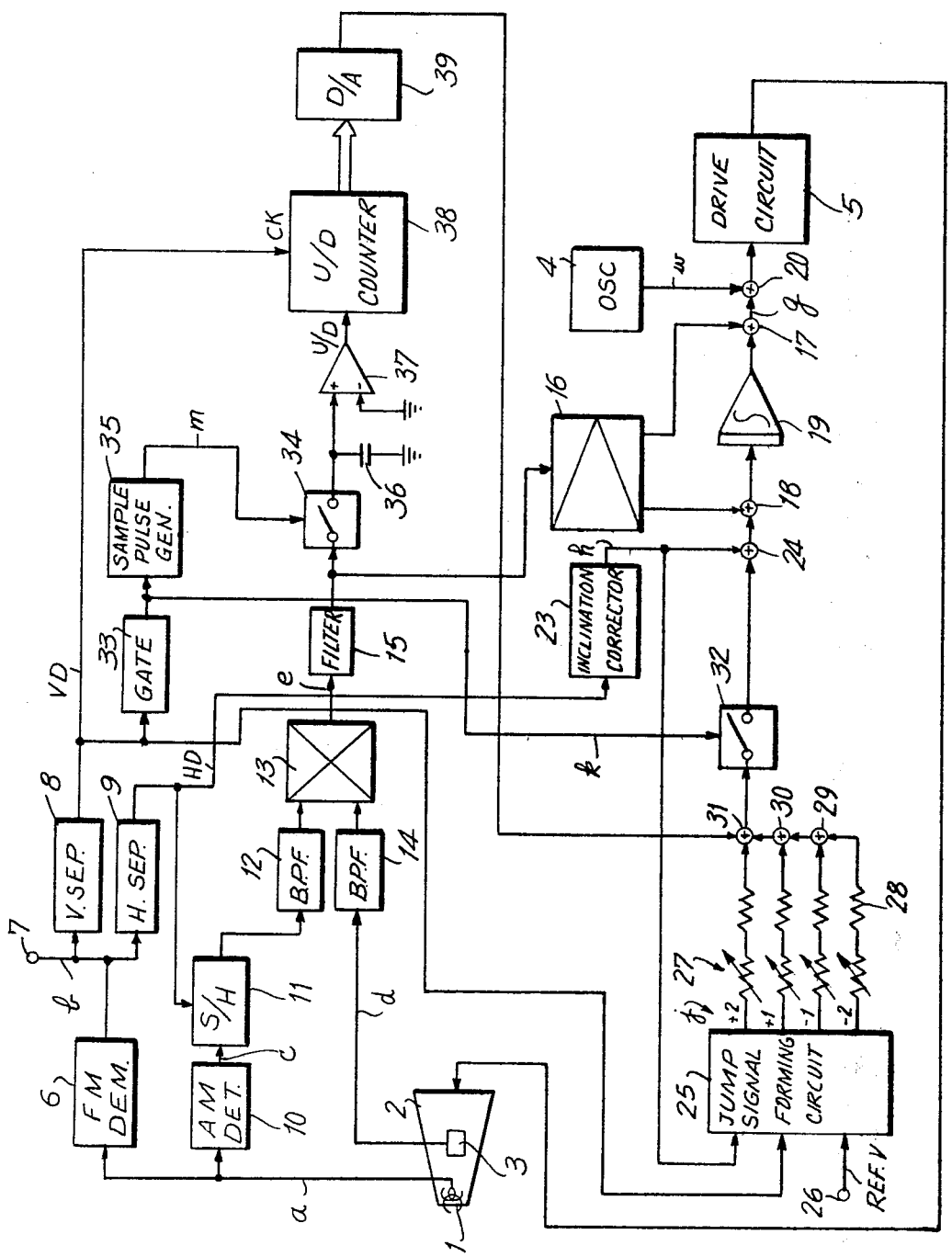
FIG. 2 is a block-circuit wiring diagram of a tracking control system according to one embodiment of this invention.

The present invention is designed to be used with a rotary head drum assembly of the known one-head VTR of the helical-scan type, for example, as described more fully in the aforementioned co-pending U.S. Pat. application Ser. No. 6/232,014, or of the known two-head VTR of the helical-scan type, for example, as described more fully in the aforementioned co-pending U.S. Pat. application Ser. No. 6/243,352, now U.S. Pat. No. 4,370,685. However, the present invention will hereinafter be described in regard to the rotary head drum assembly of the known one-head type. In particular, such rotary head drum assembly includes an upper rotary drum which is rotated by a drive shaft and a lower stationary drum which is fixed on a chassis of the VTR concentric with the drive shaft so as to be opposite the upper drum with a small gap therebetween. A magnetic head 1, as shown in FIG. 2, is attached on the lower surface of the upper drum through a bi-morph leaf 2, that is, an electromechanical transducer formed of piezoelectric elements. Head 1 rotates with the upper drum at a predetermined rotational speed and is deflected perpendicularly to its scanning path, or transversely with respect to the longitudinal direction of each record path, by means of the bi-morph leaf 2.

A magnetic tape is wrapped helically about the outer peripheries of the upper drum and lower drum over an arc of almost 360°. During the recording operation, the tape is advanced longitudinally at a predetermined speed, so that video or other information signals are recorded by head 1 in a series of parallel magnetic tracks at a predetermined slant angle to the longitudinal direction of the tape.

In the playback or reproducing operation with the tape being transported at the recording speed, an accurate video signal can be reproduced with a tracking servo system which includes a drum servo and/or capstan servo for adjusting the rotary phase of the head 1 so as to make the head correctly trace or scan the successive record tracks. In a playback mode employing an arbitrary tape speed which is different from the recording speed, both the phase and slant angle of the head scanning path do not coincide with the phase and slant angle, respectively, of the recorded track.

Therefore, in the arbitrary speed playback mode, the vertical position of head 1 must be changed by deflection of bi-morph leaf 2 in response to a control or drive signal so as to achieve initial phase error compensation and slant tracking error compensation. In addition to such compensations, it is necessary to effect tracing track selecting in order to perform overlap-tracing or interval-tracing. Overlap-tracing is required in a slow-motion playback mode employing a tape speed slower than the recording speed, and in which the head repeatedly traces or scans a recorded track and then the head scans the next track on the tape. Interval-tracing or skip-tracing is required in a fast-motion playback mode employing a tape speed faster than the recording speed, and in which one or several tracks are skipped and the head only scans the tracks at intervals. Thus, when compensating for phase and slant errors, the optimum one of the recorded tracks must be traced to correctly effect such overlap-tracing or interval-tracing while ensuring that the vertical position of the head will not go beyond the smallest possible maximum permissible deflection for the tracking operation. The alteration of the head from the track being traced to the next desired one in the overlap-tracing or interval-tracing mode is hereinafter called "track jump" or "flyback", and the minimum track jump is equal to one pitch of the recorded tracks.

A head tracking control circuit according to the present invention which performs the above-described tracking operation will now be described with reference to FIG. 2.

Generally, bi-morph leaf 2 is deflected by a drive or output voltage supplied thereto from a drive circuit or amplifier 5. The signal supplied to drive circuit 5 includes a tracking signal comprised of a slant or inclination compensation signal h, a jump voltage signal j, and a tracking error signal e, and which is combined with a dithering or wobbling signal w. In this manner, bi-morph leaf 2 is deflected in accordance with the output of drive circuit 5 to control the position of magnetic head 1 so as to accurately trace the record tracks extending obliquely on the magnetic tape.

The wobbling or dithering signal w has a frequency $f_0$, for example, $f_0 = 1.0$ KHz, so that as magnetic head 1 accurately scans each of the record tracks, it is wobbled transversely with respect to the longitudinal direction of the record track at the frequency $f_0$ and, for example, with an amplitude equal to approximately 10–20 percent of the width of the record track. As a result, the RF or FM signal a reproduced by head 1 is subjected to amplitude modulation at the wobbling or dithering frequency $f_0$. The reproduced RF signal from head 1 is fed to a frequency demodulator 6, the output b of demodulator 6, in turn, being fed from an output 7 to a video signal reproducing system (not shown) and further to a vertical synchronizing signal separating circuit 8 and a horizontal synchronizing signal separating circuit 9. The latter circuits separate the vertical and horizontal synchronizing signals VD and HD, respectively, from the reproduced video signal.

The reproduced RF signal a is further supplied to an envelope detecting circuit 10, from which an amplitude-modulation component (envelope signal) included in the RF signal is obtained. The output c of detecting circuit 10 includes information regarding the amount and direction of the tracking error of the actual scanning path relative to the recorded track. The output of detecting circuit 10 is supplied to a sample and hold circuit 11 which receives the horizontal synchronizing signals HD from horizontal synchronizing signal separating circuit 9. Thus, circuit 11 samples the output of envelope detecting circuit 10 at each horizontal synchronizing signal and holds the sampled value until receipt of the next horizontal synchronizing signal. It should be appreciated that, since the output a of head 1 is a frequency modulated (FM) wave, in recording/reproducing systems having a frequency gain characteristic, the FM wave is subjected to an amplitude modulation in accordance with the content of the picture, that is, the brightness signal. However, since the envelope signal from detecting circuit 10 is sampled and held by sample and hold circuit 11 in response to each horizontal synchronizing signal, the amplitude-modulation component which is not affected by the content of the picture is obtained from circuit 10. The value sampled by circuit 10 is supplied to one input of a multiplier circuit 13 through a band-pass filter 12, the latter circuit functioning to pass the side-band component at the central frequency $f_0$, in addition to tracking error information.

In addition, a strain gauge 3, preferably a resistive wire strain gauge, is mounted to the surface of bi-morph leaf 2 so as to detect the deflection of bi-morph leaf 2 and accordingly, of magnetic head 1. The output d of strain gauge 3 is supplied to another input of multiplier circuit 13 through a band-pass filter 14, the central frequency of which corresponds to the wobbling or dithering frequency $f_0$ of bi-morph leaf 2.

Accordingly, the deflection detecting signal d from strain gauge 3 is multiplied by the envelope signal c in multiplier circuit 13 which functions as a synchronous detector. The level and polarity of the output of multiplier circuit 13 corresponds to the amount and direction of deviation of head 1 from the track then being scanned and is hereinafter referred to as the tracking error signal e. This latter signal is supplied through a filter circuit 15 and an amplifier 16 to an adder 17 and an adder 18. Filter circuit 15 functions as a trap filter for eliminating components having a frequency $2f_0$ which are generated in multiplier circuit 13. The output of adder 18 is supplied through an integrating circuit 19, which functions to increase the gain of the low frequency components supplied thereto, to adder 17, where it is added to the output of amplifier 16. The output g of adder 17 is then added with the dithering or wobbling signal w in an adder 20, the output of adder 20, in turn, being supplied to drive circuit 5. In this manner, a tracking control loop is formed for correcting tracking errors of the magnetic head.

Further, as previously discussed, during non-normal reproducing modes, the scanning by head 1 is askew with respect to the record track desired to be scanned. It is therefore necessary to supply a ramp or slant compensation voltage to bi-morph leaf 2 to correct any inclination error. It has been found that, if the ratio of the tape reproducing speed to the tape recording speed is represented by n, the slant compensation signal for correcting the aforementioned inclination error is proportional to $|n-1|$, as discussed more fully in the aforementioned copending U.S. Pat. application Ser. No. 6/232,014. It should be appreciated that when the reproducing tape speed differs from the recording tape speed, variations in the frequency of the reproduced horizontal synchronizing signals HD appear. Accordingly, the circuit of FIG. 2 includes an inclination correcting circuit 23 supplied with the reproduced horizontal synchronizing signals HD from horizontal synchronizing signal separating circuit 9 for producing the slant compensation signal h, which corresponds to the slant compensation factor or component (n-1), and which is supplied through an adder 24 to adder 18 where it is combined with tracking error signal e from amplifier 16.

Figure 1:
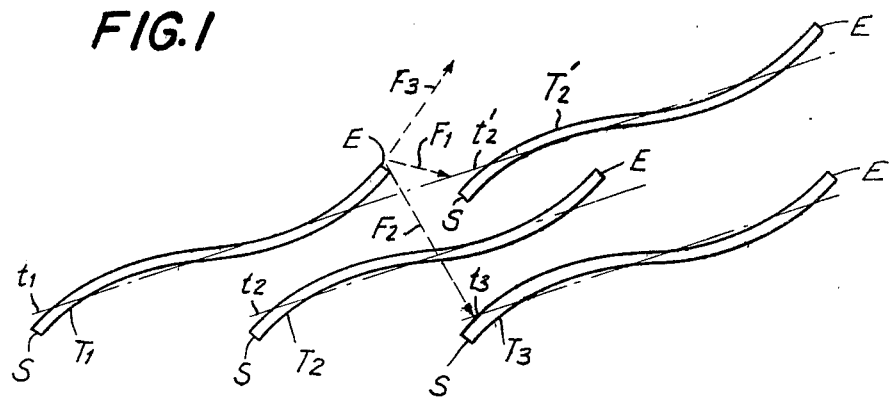
FIG. 1 is a schematic diagram illustrating the curved configuration of the record tracks on a magnetic tape.

When the tracing or scanning of a recorded track in a non-normal or special reproducing mode is completed, a head flyback motion or reset motion is imparted to the bi-morph leaf 2 so as to reset the head to the beginning of the next desired track in accordance with the track jump condition. Referring first to FIG. 1, there is shown a pattern of record tracks $T_1, T_2, T_3$ ... extending obliquely on a magnetic tape. When, for example, the reproducing tape speed is twice the recording tape speed in the fast-forward reproducing mode, the head 1 must be deflected or jumped from the concluding end E of track $T_1$ to the beginning end S of track $T_3$, that is, the head 1 must be deflected by one track pitch at the conclusion of the scanning operation of track $T_1$. One pitch is equal to the distance between adjacent record tracks. Thus, depending on the direction and speed of the tape in the reproducing mode of operation, magnetic head 1 may have to be deflected by an amount equal to nP, where P is equal to one track pitch and n is an integer $0, \pm 1, \pm 2$... As an example, for the still-motion mode of operation, head 1 repeatedly scans the same track and accordingly, is deflected by $-1$ pitch during the scan of each track. Therefore, a flyback signal of $+1$ pitch must be applied to bi-morph leaf 2 at the end of each scan to deflect the head to the beginning end of the same track to repeat the scanning operation.

As will now be discussed, the amount of flyback, that is, the track jump condition, is determined as a function of the frequency variation of the reproduced horizontal synchronizing signals HD, which corresponds to the slant compensation signal h, and as a function of the phase variation of the reproduced vertical synchronizing signals VD. In regard to the latter factor, the rotational phase of the upper rotary drum of the guide drum assembly is controlled by a reference vertical synchronizing signal REF. V. When head 1 is not deflected by bi-morph leaf 2 in the normal reproducing mode, the phase of the reproduced vertical synchronizing signal VD coincides with that of the reference vertical synchronizing signal REF. V. However, during non-normal reproduction, when head 1 is deflected in a direction normal to the longitudinal direction of the record tracks, the reproduced vertical synchronizing signal VD has its phase changed from that of the reference vertical synchronizing signal REF. V. For example, in the still motion mode of reproduction, head 1 is advanced by one pitch in the direction normal to the longitudinal direction of a record track during the scanning operation and the reproduced vertical synchronizing signal VD is advanced in phase by one horizontal interval with respect to the reference vertical synchronizing signal REF. V, due to the position shift between adjacent tracks formed obliquely on the tape. This phase variation $\Delta\phi$ corresponds to the displacement that must be imparted to the magnetic head for it to accurately scan the tracks. Thus, the phase variation $\Delta\phi$, in addition to the variation $\Delta H$ of the horizontal scanning period, is used to determine the jump condition.

In particular, a jump signal forming circuit 25 includes a phase difference detecting circuit for comparing the phase of the reproduced vertical synchronizing signal VD with that of the reference vertical synchronizing signal REF.V and to produce an output $\Delta\phi$ in response to such comparison. The reference vertical synchronizing signal REF. V appears at a time corresponding to the head reaching the concluding end of the scanning path, that is, at the point on the track at which the vertical synchronizing signal VD is recorded, and may be formed by a rotational phase detector associated with the upper rotary drum of the guide drum assembly. Accordingly, the reproduced vertical synchronizing signal VD from vertical synchronizing signal separating circuit 8 and the reference vertical synchronizing signal REF. V (from a terminal 26) are supplied to jump signal forming circuit 25, along with the slant compensation signal h, the latter corresponding to the variation $\Delta H$, whereby jump signal forming circuit 25 produces the jump signal j. The resultant jump signal is supplied through a group of variable resistors 27 for jump pitch adjustment, a second resistive group 28 for current conversion, and adders 29-31, to an analog gate device 32.

The reproduced vertical synchronizing signal VD is also supplied to a gate pulse generator 33 which supplies a gate pulse k to gate device 32 so as to cause the gate device 32 to transmit the jump signal j during the extremely short fly-back period after magnetic head 1 has completed scanning the track. It is to be appreciated that while analog gate device 32 has been schematically illustrated as including a movable contact selectively engageable with one or the other of a pair of stationary contacts, gate device 32 may be formed as a solid-state switching device. The jump signal j from gate device 32 is added with the slant compensation signal h and the tracking error signal e in adders 24 and 18, respectively, and then supplied to the aforementioned integrating circuit 19 where the signal supplied thereto is integrated with a very short time constant to generate a steep inclined voltage as the jump signal supplied to bi-morph leaf 2 through adders 17 and 20 and drive circuit 5.

However, as previously described, each of the record tracks $T_1$, $T_2$, $T_3$... is formed along a curved path on the tape rather than the ideal straight line path shown by lines $t_1$, $t_2$, $t_3$... in FIG. 1. These latter lines $t_1$, $t_2$, $t_3$ ... also represent the non-deflected scanning path of magnetic head 1 during the normal reproducing operation. As shown in FIG. 1, the beginning end S and concluding end E of each track $T_1$, $T_2$, and $T_3$ deviates from and is inclined with respect to the respective ideal straight line path $t_1$, $t_2$, and $t_3$. At this time, it is to be noted that the beginning end S refers to a plurality of horizontal line intervals which start from the beginning edge of the track, and, in like manner, the concluding end E refers to a plurality of horizontal line intervals terminating at the concluding edge of the record track. Because of the nature of the inclination at the beginning and concluding ends of each track, the magnetic head 1, after scanning the concluding end E of a track, is offset when it begins scanning the beginning end S of the next track. In other words, the scanning of the concluding end E of track $T_1$ is discontinuous with the scanning of the beginning end S of the next adjacent track $T_2$ in the normal reproducing mode. In FIG. 1, record track $T_2$ has been redrawn as record track $T'_2$ which follows record track $T_1$ along line $t_1$, for clarity of illustration. Even if magnetic head 1, after scanning track $T_1$, is returned to its non-deflected position along line $t_1$, as shown by arrow $F_1$, there still remains an offset deviation between the scanning trace of the magnetic head and the beginning end S of track $T'_2$. In such case, a hunting operation must still be performed to effect accurate scanning of the track. As previously discussed, in the case of non-normal reproducing modes, the magnetic head 1 is made to jump a number of track pitches to effect such reproduction, as shown by arrows $F_2$ and $F_3$. This results in an even further offset deviation during the scanning operation at the beginning end S of the next track to be scanned.

Accordingly, the present invention is designed to predisplace or pre-offset magnetic head 1 from the concluding end E of each scanned track to the beginning end S of the next track to be scanned. In particular, the tracking error signal e from filter circuit 15 is supplied to a sampling gate 34. A sampling pulse generator 35 which receives the gate pulse k from gate pulse generator 33, supplies a predetermined sampling pulse m to sampling gate 34 at a time when magnetic head 1 scans the beginning end S of each record track, the timing of which will later be discussed. Accordingly, at such time, the tracking error signal e is transmitted through sampling gate 34 and is stored in a capacitor 36 connected between the output of sampling gate 34 and ground. Further, the voltage stored in capacitor 36 is supplied to a comparator circuit 37 and, more particularly, to the non-inverting input of an operational amplifier thereof where it is compared with a reference potential, such as ground potential, the latter being connected to the inverting input of the operational amplifier. It should therefore be appreciated that the output of comparator circuit 37 corresponds to the polarity of the tracking error signal e, that is, to the direction of deviation of magnetic head 1 from the beginning end S of the track being scanned thereby. The polarity output from comparator circuit 37 is supplied to the UP/-DOWN control input U/D of an UP/DOWN counter 38 which counts either UP or DOWN the vertical synchronizing signals VD which are supplied to the clock input CK thereof as clock pulses. In other words, during each occurence of sampling pulse m, comparator circuit 37 produces an UP control signal, a DOWN control signal, or no signal at all when accurate scanning has been achieved. In response thereto, counter 38 counts UP or DOWN one vertical synchronizing signal VD, or does not count at all, respectively. The output from counter 38 is converted into an analog voltage in a digital-to-analog (D/A) converter 39 and then combined with the jump signal j in adder 31. The resultant signal, as previously discussed, is transmitted through gate device 32 during the fly-back period, adders 24 and 18, integrating circuit 19, adders 17 and 20 and drive circuit 5 to bi-morph leaf 2 to control the latter to accurately scan the beginning end S of the next track. It should be appreciated, therefore, that magnetic head 1 is deflected during its fly-back period by an amount corresponding to the jump pitch nP and by an amount $\alpha$ corresponding to the offset deviation between the beginning end S of the track to be scanned and the concluding end E of the track just scanned. In the normal reproducing mode, no jump signal j is formed. In such case, the signal from D/A converter 39 is the only signal transmitted through gating device 32. In this manner, magnetic head 1 is deflected to accurately scan the beginning end S of each record track T.

In operation, the tracking error signal e during the scanning operation of the beginning end of the first track is extremely large. In such case, a high level signal is produced by comparator circuit 37 which is supplied to control input U/D of counter 38 for causing the latter to count UP one vertical synchronizing signal VD. In other words, in such case, counter 38 increases the value stored therein by one incremental value. The digital value stored in counter 38 is then converted into an analog value and supplied to bi-morph leaf 2 during the head fly-back period. In other words, magnetic head 1, during the flyback period, is pre-displaced by an amount corresponding to the value previously stored in counter 38 plus an incremental value $\Delta\alpha$. The tracking error signal e at the beginning end S of the next track is then supplied to comparator circuit 37 which supplies an UP signal to control input U/D, whereby counter 38 again increments the value stored therein by the aforementioned incremental amount. The value stored in counter 38 is again supplied to bi-morph leaf 2 during the next fly-back period and causes head 1 to be pre-displaced by a greater amount than during the previous fly-back period. This operation continues for approximately one second until magnetic head 1 is pre-displaced to accurately scan the beginning end S of each track. In this regard, counter 38 may contain 7 bits of information so as to count UP or DOWN 64 numbers from a zero position. Since the vertical synchronizing signal VD is used as the clock signal, convergence occurs in approximately one second. It should be appreciated that the deviation between the concluding end E of a track and the beginning end S of the next adjacent track is substantially identical for all of the record tracks. Thus, the value stored in counter 38 will cause head 1 to be pre-displaced to the beginning end S of the next track to be scanned by an average deviation corresponding to the similarity of deviations between the tracks.

If the tracking error signal e has a negative value when head 1 begins scanning a track, comparator circuit 37 produces a low level or DOWN control signal which is supplied to counter 38 for decreasing the stored value in counter 38 by one incremental value. This decreases the pre-displacement or offset imparted to magnetic head 1 during the next fly-back period by the incremental amount $\Delta\alpha$. In this manner, counter 38 converges to a value corresponding to a stable operating point for scanning the beginning end S of each track. This stable operating point, as aforesaid, represents the average difference or deviation from the concluding end E of a track to the beginning end S of the next track to be scanned thereby. It should be appreciated that, because the incremental value $\Delta\alpha$ may not precisely align the head with the beginning ends of the tracks, counter 38 may be controlled to alternately count UP and DOWN for every track or for each scan of several tracks.

It should be appreciated that the present invention provides distinct advantages over the aforementioned tracking control system of U.S. Pat. No. 4,148,082. In particular, since the polarity of tracking error e is not affected by noise components, an accurate tracking control operation is achieved. Further, where a deviation between the concluding end E of a track and the beginning end S of the next adjacent track differs greatly from the aforementioned average value, the count or stored value in counter 38 is only changed by one incremental value, whereby the system easily returns to its stable operation when reproducing successive tracks in which the deviation between the concluding end E and the beginning end S are similar and correspond to such average value.

Figure 3:
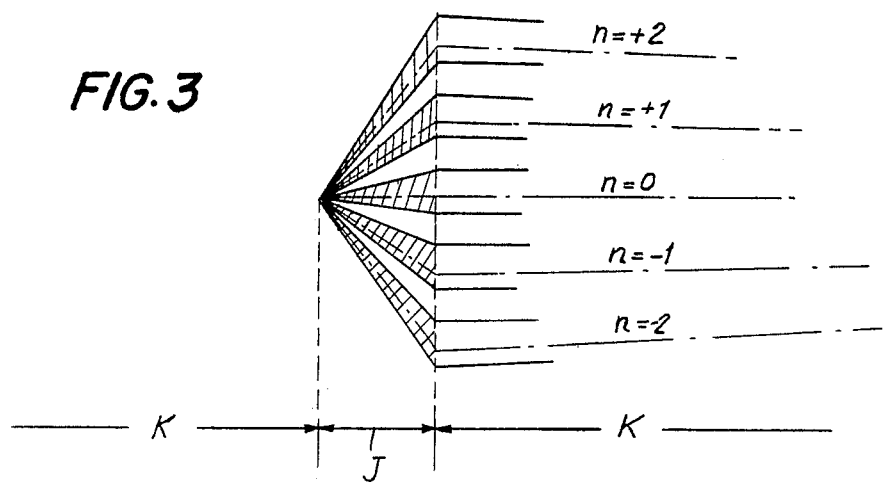
FIG. 3 is a schematic diagram illustrating the operation of the tracking control system of FIG. 2 during non-normal reproducing modes.

During the non-normal or special reproducing modes of operation, the jump signal j is combined with the signal from counter 38 and supplied to bi-morph leaf 2 during the fly-back period. Accordingly, jump signal j, during such time, is integrated by integrating circuit 19 and supplied as a triangular shaped waveform, as shown by the dot-dash lines for $n = 0, \pm 1, \pm 2, \ldots$ in FIG. 3. After the scanning period K has been completed, that is, during the fly-back period J, magnetic head 1 is further deflected by an amount $\alpha$ in the positive or negative direction depending on the polarity of tracking error signal e. This further deflection $\alpha$ in the positive or negative direction is represented by the hatched regions in FIG. 3. As previously discussed, and which is also applicable for the non-normal or special reproducing modes, the control amount $\alpha$ can only change by an incremental amount $\Delta\alpha$ for successive fly-back periods and finally converges to a point corresponding to the average tracking error e between the concluding end E of each track and the beginning end S of the next track to be scanned. In other words, the control amount $\alpha$ converges to a stable operation or zero point. This means that any variation in the similarity of the deviations between successive tracks to be scanned results in an extremely small transient vibration being produced. Accordingly, accurate scanning of the beginning ends S of the tracks is achieved.

Figure 4:
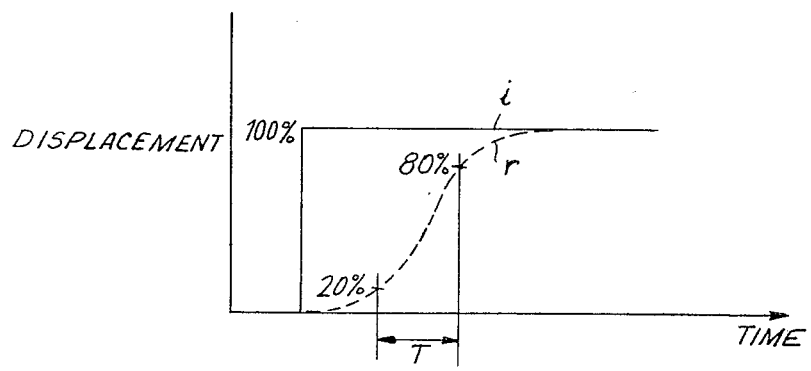
FIG. 4 is a graphical illustration of the displacement of the bi-morph leaf when a step pulse signal is supplied thereto.

Referring now to FIG. 4, the timing for sampling pulse m will now be discussed. In particular, a step-shaped input i corresponding to the tracking error is shown by the solid line in FIG. 4. With the application of such step-shaped input i to bi-morph leaf 2, the magnetic head is displaced in accordance with the response characteristic r shown by the dashed line in FIG. 4. It is difficult to determine the exact time for sampling the tracking error signal e. For example, if tracking error signal e is detected at an advanced time, the sampling operation is performed during the fly-back or track changing period of the magnetic head, and an accurate tracking error signal at the beginning end S of the track cannot be extracted. If the detection operation is delayed, magnetic head may already be accurately scanning the track so that no tracking error signal e is sampled. Accordingly, it is desirable to extract the error data in the region T shown in FIG. 4 which occurs within the transient time for the step response of the tracking control servo system at the beginning end of the track. In other words, the sampling signal m of this invention is produced in a time period T within the region when the head has been displaced from 20%–80% of its final corrected value at the beginning end of the track. Thus, by using the polarity of the tracking error signal e, rather than the level of tracking error signal e as with U.S. Pat. No. 4,148,082, another distinct advantage is provided. In particular, any deviation within time period T when error signal e is sampled will change the level of the sampled signal, but not the polarity thereof. In this manner, the relatively large S/N ratio of the error signal and any variation in time period T for detecting the error signal does not affect the operation of the tracking control system of this invention since the present invention relies only on the polarity of the tracking control system, which is the same within the entire detection period T.

It should be appreciated that many modifications may be made within the scope of this invention. For example, a charge pump circuit can be substituted for counter 38. With such circuit, a charge switch and discharge switch are used to charge and discharge a capacitor. A charge switch pulse or a discharge switch pulse, corresponding to the UP and DOWN control signals used in the embodiment in FIG. 2, and having a predetermined pulse width, are generated for controlling the charge and discharge switches. In this manner, the average offset voltage for compensating the offset deviation of the magnetic head can be obtained directly from the capacitor. Also, the offset voltage signal from counter 38 may be obtained by calculating the difference between immediately preceding sampled value and the generated sampled value.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. Apparatus for reproducing information signals recorded in successive parallel tracks on a record medium comprising:
   transducer means adapted for movement along each of the tracks in a scanning path from a beginning end to a concluding end thereof for reproducing the signals recorded therein;
   transducer deflecting means for deflecting said transducer means in a direction transverse to the direction along the tracks;
   polarity detecting means for detecting the direction of any deviation between the scanning trace of said transducer means and the track then being scanned thereby at the beginning end of said scanned track; and updating means for producing and storing a control signal in response to said polarity detecting means and for supplying said control signal to said transducer deflecting means so as to control the latter to deflect said transducer means to accurately scan the beginning ends of said tracks, said updating means being controlled by said polarity detecting means to change the value of said stored control signal by an incremental amount in accordance with the detected direction of said deviation.

2. Apparatus according to claim 1; in which said polarity detecting means includes comparator means for comparing a tracking error signal corresponding to said deviation between the scanning trace of said transducer means and the track then being scanned thereby at the beginning end of said scanned track, with a reference signal, for producing a polarity signal corresponding to the direction of said deviation.

3. Apparatus according to claim 2; in which said information signals include horizontal synchronizing signals; and in which said apparatus further includes means for producing a dithering signal, and tracking error detecting means for producing said tracking error signal, said tracking error detecting means including envelope detecting means for producing an amplitude-modulation component from said signals reproduced by said transducer means, sampling means for sampling said amplitude-modulation component at the occurrence of each horizontal synchronizing signal, and synchronous detection means for synchronously detecting the sampled amplitude-modulation component with said dithering signal to produce said tracking error signal.

4. Apparatus according to claim 3; further including sample and hold means for sampling said tracking error signal, and sampling signal generator means for supplying a sampling signal to said sample and hold means to cause the latter to sample and hold said tracking error signal at the beginning ends of the tracks and to then transmit the sampled and held tracking error signal to said comparator means.

5. Apparatus according to claim 1; in which said updating means includes UP/DOWN counter means for producing and storing said control signal and for changing the value of said stored control signal by counting one of UP and DOWN by said incremental amount in accordance with the detected direction of said deviation.

6. Apparatus according to claim 5; in which said information signals include vertical synchronizing signals; said polarity detecting means includes comparator means for comparing a tracking error signal corresponding to said deviation between the scanning trace of said transducer means and the track then being scanned thereby at the beginning end of said scanned track, with a reference signal, for producing a polarity signal corresponding to the direction of said deviation; and said UP/DOWN counter means includes an UP/DOWN control input supplied with said polarity signal for controlling said counter means to count one of UP and DOWN by said incremental amount in accordance with the detected direction of said deviation, and a clock input supplied with said vertical synchronizing signals.

7. Apparatus according to claim 5; in which said stored control signal from said counter means is in digital form and in which said updating means further includes digital-to-analog converting means for converting said control signal in digital form to analog form and for supplying said analog control signal to said transducer deflecting means so as to control the latter to deflect said transducer means to accurately scan the beginning ends of said tracks.

8. Apparatus according to claim 5; in which said stored control signal is supplied to said transducer deflecting means during the time when said transducer means is not scanning said tracks.

9. Apparatus according to claim 8; in which said information signals include vertical synchronizing signals, and said apparatus further includes gating means controlled by said vertical synchronizing signals to transmit said stored control signal to said transducer deflecting means during the time when said transducer means is not scanning said tracks.

10. Apparatus according to claim 8; in which said information signals include vertical synchronizing signals and said record medium is longitudinally advanced at a recording speed during a recording operation and at a reproducing speed during a reproducing operation; and in which said apparatus further includes jump signal forming means for producing a jump signal to eliminate phase errors between said transducer means and the beginning ends of the tracks to be scanned thereby when said reproducing speed is different from said recording speed, adder means for adding said jump signal to said stored control signal and for producing an added output, and gate means controlled by said vertical synchronizing signals to transmit said added output to said transducer deflecting means during the time when said transducer means is not scanning said tracks.

11. Apparatus according to claim 10; further including inclination correcting means for producing a slant compensation signal in response to the speed of advancement of the record medium during reproducing so as to correct any inclination tracking error of said transducer means during the scanning operation thereby; and in which said jump signal forming means produces said jump signal in response to the slant compensation signal and any phase deviation of said vertical synchronizing signals from a reference phase.

12. Apparatus according to claim 11, in which said added output transmitted through said gate means is added to said slant compensation signal and a tracking error signal corresponding to any deviation between the scanning trace of said transducer means and the track then being scanned thereby to produce a resultant signal; and said apparatus further includes integrating means for integrating said resultant signal.

13. Apparatus according to claim 12, in which said integrated resultant signal is added to said tracking error signal and to a dithering signal and is then supplied to said transducer deflecting means to cause said transducer means to accurately scan said tracks.

14. Apparatus according to claim 1; in which said updating means includes charge pump means for producing and storing said control signal and for changing the value of said stored control signal by one of adding and subtracting said incremental amount in accordance with the detected direction of said deviation.

15. Apparatus according to claim 1; in which said incremental amount has a constant value.

* * * * *